United States Patent [19]
Huesmann et al.

[11] Patent Number: 5,922,468
[45] Date of Patent: *Jul. 13, 1999

[54] TETRAFLUOROETHYLENE POLYMER DISPERSION COMPOSITION

[75] Inventors: Peter L. Huesmann, Wilmington, Del.; Michael Fryd, Moorestown, N.J.

[73] Assignee: E. I. du Pont de Nemours and Company, Wilmington, Del.

[21] Appl. No.: 08/678,880

[22] Filed: Jul. 12, 1996

Related U.S. Application Data

[60] Provisional application No. 60/001,133, Jul. 13, 1995.

[51] Int. Cl.$^6$ .......................... B32B 27/06; B32B 27/30; B32B 27/28
[52] U.S. Cl. .......................... 428/422; 428/421; 526/242; 526/250; 526/255; 525/199; 524/501; 524/502; 524/515; 524/519; 524/520; 524/522; 524/523
[58] Field of Search ..................... 428/421, 422; 524/502, 515, 501, 519, 520, 522, 523; 526/242, 256, 255; 525/199

[56] References Cited

U.S. PATENT DOCUMENTS

| | | | |
|---|---|---|---|
| 3,066,122 | 11/1962 | Brinker et al. | 260/92.1 |
| 3,142,665 | 7/1964 | Cardinal et al. | 260/92.1 |
| 3,635,926 | 1/1972 | Gresham et al. | 260/87.5 |
| 3,819,594 | 6/1974 | Holmes et al. | 260/87.5 |
| 4,118,537 | 10/1978 | Vary et al. | 428/422 |
| 4,123,401 | 10/1978 | Berghmans et al. | 260/29.6 |
| 4,180,609 | 12/1979 | Vassiliou | 428/212 |
| 4,252,859 | 2/1981 | Concannon et al. | 428/422 |
| 4,379,900 | 4/1983 | Sulzbach | 526/247 |
| 4,383,075 | 5/1983 | Abel | 524/512 |
| 4,568,573 | 2/1986 | Sunada et al. | 427/350 |
| 4,837,267 | 6/1989 | Malhotra | 524/535 |
| 5,160,791 | 11/1992 | Tannenbaum | 428/422 |
| 5,168,013 | 12/1992 | Tannenbaum | 428/422 |
| 5,168,107 | 12/1992 | Tannenbaum | 524/514 |
| 5,223,343 | 6/1993 | Tannenbaum | 428/422 |
| 5,223,562 | 6/1993 | Sagawa et al. | 524/275 |
| 5,230,961 | 7/1993 | Tannenbaum | 428/422 |
| 5,272,186 | 12/1993 | Jones | 523/339 |
| 5,322,899 | 6/1994 | Grunewalder et al. | 525/199 |
| 5,349,003 | 9/1994 | Kato et al. | 524/458 |
| 5,562,991 | 10/1996 | Tennenbaum | 428/421 |
| 5,688,884 | 11/1997 | Baker et al. | 526/225 |

FOREIGN PATENT DOCUMENTS

| | | |
|---|---|---|
| A0 056 280 | 7/1982 | European Pat. Off. . |
| A0 343 015 | 11/1989 | European Pat. Off. . |
| A0 515 030 | 11/1992 | European Pat. Off. . |
| WO 93/03919 | 3/1993 | European Pat. Off. . |
| WO 93/03921 | 3/1993 | European Pat. Off. . |
| A0 659 853 | 6/1995 | European Pat. Off. . |
| A2 190 845 | 2/1974 | France . |
| WOA94 14904 | 7/1994 | WIPO . |

*Primary Examiner*—Vivian Chen

[57] ABSTRACT

Coating dispersions for articles containing either (a) a tetrafluoroethylene homopolymer having a standard specific gravity of at least 2.250 and a melt viscosity of $3 \times 10^8$ to $3 \times 10^9$ Pa·s or (b) a non-melt-fabricable tetrafluoroethylene copolymer having a standard specific gravity of at least 2.165 and a melt creep viscosity of $1 \times 10^7$ to $1 \times 10^9$ Pa·s.

18 Claims, No Drawings

TETRAFLUOROETHYLENE POLYMER DISPERSION COMPOSITION

This Application claims the benefit of U.S. Provisional Patent Application No. 60/001,133, filed on Jul. 13, 1995 in the names of Peter L. Huesmann et al. and entitled "Tetrafluoroethylene Polymer Dispersion Composition" the disclosure of which is incorporated by reference.

FIELD OF THE INVENTION

This invention is in the field of fluoropolymer dispersion compositions which can be used to coat various substrates, especially for applications in which non-stick surface properties are desired. Such dispersion compositions can increase the adhesion between the substrate and a surface coating.

BACKGROUND OF THE INVENTION

Generally in the art a metal or glass substrate is roughened by some means before the first layer of coating is applied so that mechanical bonding will assist chemical adhesive means in holding the coating onto the substrate. Typical roughening means include acid etching, sand-blasting, grit-blasting, and baking a rough layer of glass, ceramic or enamel frit onto the substrate. The problem of adhesion of non-stick coatings to substrate is exacerbated by the nature of the coatings. If the coating is optimized for release to prevent food from sticking to it, for easy clean-up after cooking or durability, or to facilitate low friction sliding contact, almost by definition there will be difficulties in making it adhere to the substrate.

The substrate can be metal, often aluminum or stainless steel used for cooking or in industrial applications. It can be glass or ceramic. It might even be plastic for microwave oven cookware, or it could be an industrial article such as a saw made of carbon steel. Whatever the substrate or application, if it is necessary to roughen the substrate to make the coating adhere, that at least adds cost and can add other difficulties including creating a rough profile which can protrude or telegraph through the coating. This is especially undesirable when smoothness is sought, such as for saws, steam irons and copier rolls. The environmental cost of disposing of etchant materials can be significant. Sometimes, especially for glass and ceramic substrate, it can cause unacceptable weakness or brittleness of the substrate.

Means of enhancing adhesion of non-stick coatings to a substrate are illustrated in the following patents.

U.S. Pat. No. 4,049,863 (Vassiliou) discloses a primer containing fluoropolymer, such as polytetrafluoroethylene (PTFE), colloidal silica, and a polyamide imide (PAI), along with other constituents, applied by various techniques to a substrate that is preferably pretreated by grit-blasting, flame spraying of metals or metal oxides or frit coating, or to phosphated and chromated metals. The PTFE:PAI ratio can be 1:9. The primer coat is ordinarily applied at a thickness of 2–15 $\mu$m. After air drying, the primer coat is top-coated with a conventional fluoropolymer enamel and baked. (Parts, percentages and proportions herein are by weight except where indicated otherwise.)

U.S. Pat. No. 5,230,961 (Tannenbaum) teaches concentration gradient coatings based on a primer which is applied to the substrate in the form of an aqueous dispersion comprising perfluorocarbon resin and at least one of polyamide imide, polyarylene sulfide and polyethersulfone resins where the perfluorocarbon resin comprises 50–90% by weight of a first resin of polytetrafluoroethylene having a melt viscosity of at least about $10^{10}$ poise ($10^9$ Pa·s) plus 50–10% of a second resin of perfluorinated copolymer (FEP) of hexafluoropropylene and tetrafluoroethylene having a melt viscosity in the range of $10^3$ to $10^8$ poise ($10^2$ to $10^7$ Pa·s) and a topcoat and any intermediate coats comprising perfluorocarbon resin.

Similar examples of aqueous blending of high and low melt viscosity resins are described in U.S. Pat. Nos. 5,168,107; 5,168,013; 5,223,343 and 5,240,775 (all to Tannenbaum) and U.S. Pat. No. 4,087,394 (Concannon).

Also, British Patent 1,454,255 (Berghmans & Seymus) discloses aqueous dispersion coatings of mixtures of PTFE and FEP with $SiO_2$ and aluminum phosphate on preferably grit-blasted or frit-coated aluminum, but also on un-treated aluminum.

U.S. Pat. No. 4,287,112 (Berghmans) discloses PPS with PTFE, FEP and/or a co-polymer (PFA) of TFE and perfluoro (alkyl vinyl ether) (PAVE) as described in U.S. Pat. No. 4,292,859 and 4,351,883 (Concannon), along with aluminum flake and $TiO_2$ pigment, in both aqueous and non-aqueous coatings. The preferred PTFE is irradiated micropowder. PTFE micropowder may be made according to the teachings of U.S. Pat. No. 3,116,226 (Bowers); 4,029,890 (Brown etal.) or 4,200,551 (Derbyshire).

Perfluoropolymer concentration gradient coatings obtained from non-aqueous formulations are also known. Disclosures in U.S. Pat. No. 3,661,831 and 4,143,204 are representative. A mixture of FEP and PTFE in an anhydrous organosol is also disclosed in U.S. Pat. No. 3,904,575 (Satokawa), which states that a higher stability of the organosol is generally obtained by a lower degree of polymerization of PTFE or a lower content of PTFE. The use of PAI and other film formers is also disclosed. The examples teach sand-blasting of an aluminum substrate before applying the coating.

Coatings systems including intermediate coats and top-coats are described in various patents including U.S. Pat. Nos. 4,049,863 (Vassiliou); 4,118,537 (Vary & Vassiliou); 4,123,401 (Berghmans & Vary); 4,252,859 (Concannon & Vary) and 4,351,882 (Concannon), all incorporated herein by reference.

Such blends of high and low melt viscosity fluoropolymers give an effective concentration gradient after baking the primer, achieving adhesion to the substrate without typical roughening means such as chemical etching, sand-blasting, or grit-blasting.

It would be advantageous to obtain the same effect without the necessity of blending fluoropolymer resins. Coatings, and coating formulations, based on a single perfluorocarbon resin are therefore desired. Non-melt-fabricable TFE polymers that will yield such improved coatings are also desired.

Tetrafluoroethylene (TFE) polymers are well known. The group of TFE polymers includes polytetrafluoroethylene (PTFE), and copolymers of TFE with such small concentrations of copolymerizable modifying monomers that the resins remain non-melt-fabricable (modified PTFE). The modifying monomer can be, for example, hexafluoropropylene (HFP), perfluoro(propyl vinyl ether) (PPVE), chlorotrifluoroethylene (CTFE), or other monomer that introduces side groups into the molecule. The concentration of such modifiers is usually less than 1 wt %, commonly less that 0.5 wt %.

PTFE and modified PTFE can be produced by the process known as dispersion polymerization, which typically yields an aqueous dispersion (raw dispersion) of small particles which can be coagulated and dried to obtain coagulated dispersion resin (also known in the art as fine powder) or concentrated and/or stabilized for use as a dispersion. Dispersions are useful for various purposes, including the coating of metal substrates. When non-melt-fabricable TFE polymer resin is used to make coatings on metal substrates, dispersions of PTFE having melt viscosity of the order of $10^{10}$ Pa·s are ordinarily used in complex formulations (paints) designed to enhance film formation and productivity in large volume commercial processes. These processes involve drying of wet coating deposit and subsequent fusion of the PTFE. With the high viscosity of prior art PTFE resins, fusion (baking) time is long and consolidation of the PTFE to a pore-free film is difficult to achieve.

Holmes & Fasig in U.S. Pat. No. 3,819,594 disclose a TFE fine powder resin consisting essentially of a copolymer of TFE with 0.03–1.0 wt % of perfluoro(alkyl vinyl ether) (PAVE), the resin having MV of from $1\times10^9$ to $4.0\times10^{10}$ poise ($1\times10^8$ to $4.0\times10^9$ Pa·s), a standard specific gravity of no greater than 2.175, and a flex life of at least $8\times10^6$ cycles after aging at 322° C. for 30 days. Utility of such resin for coatings is not disclosed.

Morgan in U.S. Pat. No. 4,879,362 discloses a dispersion-produced non-melt-fabricable TFE copolymer having rheometer pressure of less than 24.1 MPa (3500 psi) (lubricated extrusion pressure as determined according to ASTM D-1457). Resin obtained by coagulating and drying the raw dispersion, in addition to having unusually low rheometer pressure, has low paste extruded green strength, and is non-agglomerating and non-fibrillatible. As such, it forms platelets on shear blending into elastomeric compositions instead of fibrillating. Utility of such resin for coatings is not disclosed.

The disclosure of the aforementioned patents, patent applications and publications are hereby incorporated by reference.

SUMMARY OF THE INVENTION

This invention provides a coated article comprising a substrate coated with a coating having at least two layers, comprising a prime coat, a topcoat, and optionally one or more intermediate coats between said prime coat and said topcoat, wherein at least said prime coat comprises a tetrafluoroethylene polymer selected from (a) a tetrafluoroethylene homopolymer, said polymer having standard specific gravity of at least 2.250 and melt viscosity in the range from about $3\times10^8$ to about $3\times10^9$ Pa·s, and (b) a non-melt-fabricable tetrafluoroethylene copolymer, said copolymer containing at least 0.01% by weight of comonomer and having standard specific gravity of at least 2.165 and melt viscosity in the range from $1\times10^7$ to $1\times10^9$ Pa·s. When such tetrafluoroethylene polymers are used, effective stratification as indicated by good adhesion to the substrate is achieved without the necessity to blend with other fluoropolymer, though such blending is optional.

This invention provides a coating composition comprising aqueous medium and particles of the non-melt-fabricable tetrafluoroethylene copolymer of (a) or (b).

Preferably, when the coating is a prime coat, or the coating composition is a primer, the prime coat or primer further comprises an adhesion promoter. Preferred adhesion promoter comprises at least one of polyamide imide, polyarylene sulfide and polyethersulfone resins.

Preferably, when the coating composition is used to deposit topcoat or optional intermediate coats, the coating composition further comprises particles of acrylic copolymer having decomposition temperature of less than 340° C. as determined by thermogravimetric analysis.

The invention further provides a non-melt-fabricable tetrafluoroethylene copolymer, said copolymer containing at least 0.001% by weight of comonomer, and having standard specific gravity of greater than 2.165, e.g., about 2.175, melt creep viscosity in the range from about $1\times10^7$ to about $1\times10^9$ Pa·s, and rheometer pressure greater than 24.1 MPa.

The invention further provides a tetrafluoroethylene homopolymer having standard specific gravity of at least 2.250 and melt viscosity in the range from about $3\times10^8$ to about $3\times10^9$ Pa·s.

DETAILED DESCRIPTION OF THE INVENTION

It has been discovered that TFE polymer resin, including PTFE and modified PTFE, having melt viscosity substantially lower than that of PTFE customarily used, when used alone surprisingly yields coatings having improved performance. Furthermore, aqueous dispersions of such modified PTFE, and coating formulations based on such dispersions, have significantly better shear stability.

The TFE polymer resins of this invention, and used in coatings of this invention, include the group of copolymers of TFE with such small concentrations of at least one copolymerizable modifying monomer that the melting point of the polymer (modified PTFE) is not substantially lower than that of hompolymer polytetrafluoroethylene. Concentration of modifying monomer is at least 0.01 wt %, but less than 1 wt %, preferably 0.1–0.5 wt %. These copolymers are non-melt-fabricable, have standard specific gravity (SSG) of at least 2.165, e.g, about 2.175, and have melt viscosity (MV) in the range from $1\times10^7$ to $1\times10^9$ Pa·s. Preferably, SSG is at least 2.180 and MV is from $1\times10^7$ to $3\times10^8$ Pa·s. A Modifying monomer can be, for example, perfluorobutyl ethylene (PFBE), chlorotrifluoroethylene (CTFE), perfluoroolefins having 3–8 carbon atoms, or other monomer that introduces side groups into the molecule. Fluorinated monomers include those in the group consisting of fluorinated vinyl ethers (FVE) of the formula $CF_2=CFOR$ or $CF_2=CFOR'OR$ wherein —R, and —R'— are independently completely-fluorinated or partially-fluorinated linear or branched alkyl and alkylene groups containing 1–8 carbon atoms, respectively. Preferred —R groups contain 1–5 carbon atoms, while preferred —R'— groups contain 2–4 carbon atoms. Perfluorinated monomers are preferred as modifying monomers, and include hexafluoropropylene (HFP) and perfluoro(alkyl vinyl ether) (PAVE) with alkyl group containing 1–3 carbon atoms.

The TFE polymer resins of this invention, and used in coatings of this invention, also include PTFE homopolymer. Such PTFE has standard specific gravity of at least 2.250 and melt viscosity in the range from about $3\times10^8$ to about $3\times10^9$ Pa·s, preferably from $8\times10^8$ to $3\times10^9$ Pa·s.

The PTFE and modified PTFE used in coatings and coating formulations of this invention can be made by dispersion polymerization techniques generally known in the art. The PTFE and modified PTFE, and dispersions thereof, of this invention can also be made by generally known techniques with adjustment of ingredients and procedures to achieve polymer properties heretofore not found useful.

An acrylic polymer, which functions as a film former, is used in one embodiment of the dispersion compositions of this invention. As used herein, "film former" indicates that the acrylic polymer readily forms a film at ambient temperature or above as the liquid medium of the dispersion evaporates. It is desired for the film former acrylic polymer to have low glass transition temperature (Tg), such as Tg of less than 40° C., even more desirably less than 30° C. It is also desired that the film former decompose and evaporate cleanly after the fluoropolymer resin particles start to coalesce into a coherent fluoropolymer film. These processes, that is, liquid evaporation, film forming, film former decomposition, and fluoropolymer resin coalescence, take place at very high rates in commercial coating processes. Preferably, the acrylic polymer decomposes at a temperature of less than 380° C., more preferably less than 340° C., determined as outlined below. Low decomposition temperature of the acrylic polymer is favored by selection of monomer units that provide bulky side groups in the polymer, i.e., side groups having at least 2 atoms, preferably at least 4 atoms, other than hydrogen. Butyl acrylate (BA), butyl methacrylate (BMA), and methacrylic acid (MAA) are examples of monomers that provide bulky side groups. Suitable acrylic polymers include copolymers of BA or BMA with MAA. In such copolymers, Tg increases with MAA content, so MAA content should be low in order to realize the desirable values of Tg as recited above. For copolymers of BMA and MAA, composition can be in the range BMA/MAA=93/7 to 98/2 by weight, preferably 95/5 to 97/3. A nominal composition of BMA/MAA =96/4 by weight has been found to be satisfactory. The acrylic copolymer can be made by conventional aqueous polymerization procedures to obtain an aqueous dispersion.

When the dispersion composition of this invention is a primer, it generally contains an adhesion promoter. Adhesion promoters that can be used in the primer, and hence the prime coat, of this invention include at least one of polyamide imide, polyarylene sulfide and polyether sulfone resins. Polyamide imide is preferred, either alone or in combination with other adhesion promoter. Such adhesion promoters are commercially available.

Dispersion compositions of this invention can contain, in addition to fluoropolymer and acrylic, or fluoropolymer and adhesion promoter, one or more additives to enhance shelf life of the composition, coating characteristics, and/or properties of the coating on a substrate, such as antioxidants, pigments, viscosity modifiers, fillers, surfactants, flow control agents, anti-microbial agents, and the like.

EXAMPLES

In the following examples, all parts are by weight unless otherwise stated.

Solids content of PTFE raw dispersion (as polymerized) was measured gravimetrically, that is, by weighing a sample before and after drying. Raw dispersion particle size (RDPS) was measured either by the turbidity method or by photon correlation spectroscopy (PCS).

Samples of PTFE resin were prepared for measurement of standard specific gravity (SSG), melt viscosity (MV), and rheometer pressure by coagulating the raw dispersion by vigorous agitation, separating the liquid, and drying at 150° C. for about 72 hr in a circulating air oven. SSG was measured by the method of ASTM D-4895. MV was measured 380° C. by the tensile creep method disclosed in U.S. Pat. No. 4,837,267; hereby incorporated by reference. Rheometer pressure was measured by the method of ASTM D-1457 Section 13.10 using 18.4 wt % Isopar® G (Exxon) lubricant and a reduction ratio of 1600:1.

Comonomer content of the modified PTFE resins was determined by Fourier transform infrared spectroscopy. HFP content and PPVE content were determined by the methods disclosed in U.S. Pat. No. 4,837,267 using a calibration curve to convert PPVE absorbance to PPVE content in wt %.

To prepare concentrated and stabilized dispersions, raw dispersion was concentrated to about 60 wt % solids based on total solids and liquid by the method disclosed by Marks & Whipple in U.S. Pat. No. 3,037,953 using Triton® X-100 non-ionic surfactant (Union Carbide). Optionally, additional surfactant was added to adjust surfactant concentration to desired level. Surfactant concentration is expressed in wt % based on weight of PTFE solids.

For the acrylic copolymer, Tg was determined by differential scanning calorimetry at a heating rate of 10° C./min. Decomposition of the acrylic copolymer was characterized by thermogravimetric analysis.

Coatings having a prime coat and a topcoat made from primer and topcoat formulations based on concentrated dispersions as detailed in the examples to follow. An aluminum substrate surface was prepared by washing with acetone to remove oil and dirt, and air dried or dried at 150° F. (66° C.) for 10 min. The prime coat was applied by spraying to obtain a dry film thickness (DFT) of 5–10 µm. The topcoat was then sprayed to obtain a topcoat thickness of 15–17.5 µm DFT. Unless otherwise indicated, the films were then baked for 10 min at 300° F. (149° C.) followed by a high temperature bake for a minimum of 4–5 min at temperature above 800° F. (427° C.). For tests reported below, total DFT values were in the range 0.9–1.2 mil (22.9–30.5 µm).

Substrates coated as above were subjected to a post water adhesion (PWA) test, as follows. The coated substrate is soaked in boiling water for 20 min. The coating was cut down to the substrate, and an operator then attempts to pull back the coating with a fingernail. If the coating can be pulled away from the substrate for 1 cm or more, the coating is considered to fail the PWA test. If the coating cannot be pulled loose for a distance of 1 cm, the coating is considered to pass the PWA test. Substrates coated as above were also subjected to a cross- hatch (x-hatch) test for adhesion. The coated sample is scribed with a razor blade, aided by a stainless steel template, to make 11 parallel cuts about 3/32 inch (2.4 mm) apart through the film to the metal surface. This procedure is repeated at right angles to the first cuts to produce a grid of 100 squares. The coated and scribed sample is immersed in boiling water for 20 minutes, and then is removed from the water and cooled to room temperature without quenching the sample. Then a strip of transparent tape (3M Brand No. 898), 0.75 by 2.16 inch (1.9 by 5.5 cm), is pressed firmly over the scribed area with the tape oriented in a parallel direction to the scribed lines. The tape is then pulled off at a 90° angle rapidly but without jerking. This step is repeated at a 90° angle to the first step with a fresh piece of tape, and then repeated two times more again at 90° angles to the previous step, each time with a fresh piece of tape. Passing the test requires that no squares be removed from the 100-square grid.

Accelerated cooking testing was carried out with coated frying pans using the tiger paw test disclosed by Concannon in U.S. Pat. No. 4,252,859. The number of standard cooking cycles required for a coating to deteriorate to a rating of 5 is determined as a measure of coating performance. Reported results are the average of tests on 6–12 samples, normalized to a total DFT of 1 mil (25.4 µm)

Example 1

A cylindrical, horizontally disposed, waterjacketed, paddlestirred stainless steel reactor having a length to diameter ratio of about 1.5 and a water capacity of 79 parts by weight, was charged with 42 parts of demineralized water and 1.32 parts of hydrocarbon wax. The reactor was heated to 65° C., evacuated, purged with TFE, and then evacuated again. The vacuum in the reactor was then used to draw in a solution of 0.0055 part of ammonium perfluorooctanoate (C-8) surfactant, 0.0037 part methanol, and 0.0002 part Triton® X-100 in water (1.58 parts). The reactor was then sealed, agitation was begun at 46 rpm, and the reactor temperature was raised to 90° C. After the temperature had become steady at 90° C., TFE was added to the reactor to achieve a final pressure of 400 psig (2.86 MPa). This was followed by pumping 2.205 parts of freshly prepared aqueous initiator solution containing 0.06 wt % of ammonium persulfate (APS) and 3 wt % of disuccinic acid peroxide (DSP) into the reactor. After the polymerization had begun as indicated by a 10 psig (0.07 MPa) drop in reactor pressure, additional TFE was added to maintain pressure constant at 400 psig. After 3.80 parts of TFE was added to the reactor, 2.24 parts of an aqueous solution of 3.25 wt % C-8 was added to the reactor at a rate of 0.112 part/minute. After a total 33 parts of TFE had been added to the reactor after kickoff (66 min) the TFE feed was then stopped and the polymerization was continued until the pressure dropped to 175 psig (1.31 MPa). Then the agitator was stopped, the reactor was vented and cooled to 80° C. The PTFE dispersion was then discharged from the reactor and saved. Solids content was 45.0% and RDPS was 158 nm (turbidity method). SSG was 2.268 and MV was $2.43 \times 10^9$ Pa·s. The remaining dispersion was concentrated to 61.5% solids and 3.5% Triton® X-100.

Example 2

The procedure of Example 1 was essentially repeated except that 0.108 part of HFP was pumped into the reactor after first pressure up with TFE and before first initiator introduction. Solids content of the modified PTFE raw dispersion was 45.7 wt % and RDPS was 125 nm (turbidity method). SSG was 2.260, MV was $1.8 \times 10^8$ Pa·s, HFP content was 0.13 wt %, and rheometer pressure was 11,993 psi (82.7 MPa). The remaining raw dispersion was concentrated to 60.1 wt % solids and 5.8 wt % Triton® X-100.

Example 3

The procedure of Example 2 was essentially repeated except that the freshly prepared initiator solution pumped following HFP introduction contained 0.1 wt % APS and 4 wt % DSP. The solids content of the modified PTFE raw dispersion was 45.5 wt % and the RDPS was 122 nm (turbidity method). SSG was 2.265, MV was $6.6 \times 10^7$ Pa·s, HFP content was 0.20 wt %, and rheometer pressure was 6846 psi (47.2 MPa). The remaining raw dispersion was concentrated to 59.9 wt % solids and 5.7 wt % Triton® X-100.

Example 4

The procedure of Example 3 was essentially repeated with the exception that the addition of 0.108 part of hexafluoropropylene (HFP) was replaced by addition of 0.072 part of perfluoro(propyl vinyl ether) (PPVE). The solids content of the modified PTFE raw dispersion was 45.7 wt % and RDPS was 121 nm (turbidity method). SSG was 2.243, MV was $5.4 \times 10^7$ Pa·s, PPVE content was 0.10 wt %, and rheometer pressure was 11,080 psi (76.4 MPa). The remaining raw dispersion was concentrated to 60.7 wt % solids and 5.9 wt % Triton® X-100.

Example 5

The reactor used in Example 1 was charged with water and wax, heated, purged, and evacuated, all essentially as in Example 1. The vacuum in the reactor was then used to draw in a solution of 0.0044 part of C-8 and 0.0018 part of methanol in 1.50 parts of water. The reactor was then sealed, agitation was begun at 46 rpm, and the reactor temperature was raised to 90° C. After the temperature had become steady at 90° C., TFE was added to the reactor to achieve a final pressure of 400 psig (2.86 MPa). Then 0.115 part of PPVE was pumped to the reactor. This was followed by pumping 2.205 part of freshly prepared aqueous initiator solution containing 0.06 wt % of APS and 4 wt % of DSP into the reactor. After the polymerization had begun as indicated by a 10 psig (0.07 MPa) drop in reactor pressure, additional TFE was added to maintain pressure constant at 400 psig. After 3.00 parts of TFE were added to the reactor, 2.26 parts of an aqueous solution of 5.0 wt % C-8 were added to the reactor at a rate of 0.112 part/min. After a total of 33 parts of TFE had been added to the reactor after kickoff (133 min), the TFE feed was then stopped and the polymerization was continued until the pressure dropped to 175 psig (1.31 MPa). Then the agitator was stopped, and the reactor was vented and cooled to 80° C. The modified PTFE dispersion was then discharged from the reactor and saved. The solids content of the raw dispersion was 45.5 wt % and RDPS was 253 nm (PCS method). SSG was 2.227, MV was $1.8 \times 10^8$ Pa·s, PPVE content was 0.21 wt %, and rheometer pressure was 9751 psi (67.2 MPa). The remaining raw dispersion was concentrated to 59.9 wt% solids and 5.7 wt % Triton® X-100.

Example 6

The reactor used in Example 1 was charged with water and wax, heated, purged, and evacuated, all essentially as in Example 1. The vacuum in the reactor was then used to draw in a solution of 0.0088 part of C-8 and 0.00088 part of methanol in 1.22 parts of water. The reactor was then sealed, agitation was begun at 46 rpm, and the reactor temperature was raised to 78° C. After the temperature had become steady at 78° C., TFE was added to the reactor to achieve a final pressure of 380 psig (2.72 MPa). Then 0.111 part of PPVE was pumped to the reactor. This was followed by pumping 2.20 parts of freshly prepared aqueous initiator solution containing 0.10 wt % of APS into the reactor. After the polymerization had begun as indicated by a 10 psig (0.07 MPa) drop in reactor pressure, additional TFE was added to maintain pressure constant at 380 psig. After 3.0 parts of TFE were added to the reactor, 2.13 parts of an aqueous solution of 5.46 wt % C-8 were added to the reactor at a rate of 0.106 part/min. After a total 33 parts of TFE had been added to the reactor after kickoff (90 min), the TFE feed was stopped and the polymerization was continued until the pressure dropped to 175 psig (1.31 MPa). Then the agitator was stopped and the reactor was vented. The modified PTFE dispersion was then discharged from the reactor and saved. The solids content of the raw dispersion was 45.5 wt % and RDPS was 249 nm (PCS method). SSG was 2.175, MV was $2.0 \times 10^8$ Pa·s, PPVE content was 0.23 wt %, and rheometer pressure was 7905 psi (54.5 MPa). The remaining raw dispersion was concentrated to 60.2 wt % solids and 5.6 wt % Triton® X-100.

Example 7

An aqueous dispersion of an acrylic polymer of 96 wt % butyl methacrylate (BMA) and 4 wt % methacrylic acid (MAA) was prepared by charging the following constituents into a reactor equipped with a heat source, a thermometer and a stirrer.

| Portion | Ingredient | Wt Parts |
|---|---|---|
| 1 | Demineralized water | 3888.0 |
|  | Sodium lauryl sulfate (30% aqueous) | 11.1 |
| 2 | Butyl methacrylate | 3326.4 |
|  | Methacrylic acid | 138.7 |
| 3 | Demineralized water | 679.2 |
|  | Sodium lauryl sulfate (30% aqueous) | 60.5 |
| 4 | Demineralized water | 176.2 |
|  | Ammonium persulfate | 5.8 |
| 5 | Demineralized water | 44.2 |
|  | Ammonium persulfate | 1.1 |
| 6 | Demineralized Water | 271.2 |
|  | triethanol amine | 62.4 |
|  | Total | 3664.8 |

Portion 1 was charged into the reaction vessel, blanketed with nitrogen and heated to 80° C. with continued stirring. Portion 4 was added and then Portions 2 and 3 were added over 160 min. Portion 5 was added and then after 90 min the contents of the vessel were cooled to 30° C. Portion 6 was added over 15 min with continued stirring. The resulting aqueous dispersion had a solids content of 40.7 wt %, an average particle size of 148 nm, a Tg of 28.6°C. and a maximum rate of decomposition at 325° C. as measured by TGA.

Control A

Primer and topcoat coating formulations summarized in Table 1 and Table 2 were prepared following EXAMPLE 1 of Tannenbaum in U.S. Pat. No. 5,230,961, hereby incorporated by reference, using blending techniques normal in the art as disclosed therein. For those ingredients introduced as aqueous dispersions (e.g., colloidal silica, PTFE), the amounts shown are the solids fractions. The amounts of water introduced by such dispersions are consolidated in a single entry for water which includes any added demineralized water. The polyamide imide dispersion was that disclosed by Vassiliou in U.S. Pat. No. 4,049,863 and the ultramarine blue was that disclosed by Concannon and Rummel in U.S. Pat. No. 4,425,448; both of which hereby incorporated by reference. The FEP fluoropolymer was a TFE/HFP copolymer having HFPI of 3.80 and MV of $3.5\times10^3$ Pa·s, prepared as an aqueous dispersion generally according to Bro & Sandt (U.S. Pat. No. 2,946,763; hereby incorporated by reference) having RDPS of 185 nm and concentrated to 55.5 wt % solids and 4.6 wt % Triton® X-100. The high molecular weight PTFE had MV of about $1\times10^{10}$ Pa·s and SSG of about 2.23, and was used as a concentrated aqueous dispersion having solids content of about 60 wt % and about 6 wt % Triton® X-100 (Teflon® TFE fluoropolymer resin dispersion grade 30, DuPont).

TABLE I

Control A Primer Formulation

| Amount (wt %) | Ingredient |
|---|---|
| 6.90 | Ultramarine Blue |
| 0.05 | Afflair ® pigment (EM Industries) |
| 0.01 | Zinc oxide |
| 1.03 | Colloidal silica (Ludox ® AM, DuPont) |
| 7.17 | High molecular weight PTFE |
| 4.53 | FEP fluoropolymer |
| 4.98 | Polyamide imide (AI-10, Amoco) |
| 0.70 | Triton ® X-100 (Union Carbide) |
| 65.50 | Water |

TABLE I-continued

Control A Primer Formulation

| Amount (wt %) | Ingredient |
|---|---|
| 0.70 | Diethylethanol amine |
| 1.39 | Triethyl amine |
| 3.84 | Furfuryl alcohol |
| 3.23 | N-methyl-2-pyrrolidone |

TABLE 2

Control A Topcoat Form

| Amount (wt %) | Ingredient |
|---|---|
| 1.31 | Afflair ® pigment (blend) |
| 0.15 | Channel black pigment |
| 0.07 | Aluminum silicate |
| 41.89 | High molecular weight PTFE |
| 5.00 | Acrylic polymer of MMA/EA/MAA = 39/57/4 molar |
| 0.57 | Cerium octoate |
| 1.19 | Oleic acid |
| 0.02 | Sodium polynapthalene sulfonate |
| 3.12 | Triton ® X-100 |
| 2.35 | Diethylene glycol monobutyl ether |
| 36.99 | Water |
| 4.47 | Triethanol amine |
| 2.88 | Aromatic hydrocarbon |

Coatings were applied to aluminum substrates and tested as described above. All coatings passed the PWA test. Average performance in the accelerated cooking test was 76 cooks/mil to a rating of 5.

Example 8 Formulation w/Ex 1 Polymer

The formulas of Control A were essentially repeated except that (1) in the primer formulation described in Table 1, the 7.169 parts of high molecular weight PTFE and the 4.532 parts of FEP were replaced by 11.7 parts of the polymer prepared in Example 1, and (2) the 41.887 parts of high molecular weight PTFE in the top-coat formulation described in Table 2 were replaced by 41.887 parts of the PTFE prepared in Example 1. Coatings were applied to aluminum substrates and tested as described above. All coatings passed the PWA test. Average performance in the accelerated cooking test was 106 cooks/mil to a rating of 5, substantially better than Control A. These results show that coatings of this invention have excellent performance without a blend of fluoropolymers in the primer composition, and thus in the prime coat.

Example 9 Formulation w/Ex 2 Polymer

Example 8 was repeated except that the modified PTFE prepared in Example 2 was used instead of the PTFE from Example 1. All coatings passed the PWA test. Average performance in the accelerated cooking test was 112 cooks/mil to a rating of 5, substantially better than Control A.

Example 10 Formulation w/Ex 3 Polymer

Example 8 was repeated except that the modified PTFE prepared in Example 3 was used instead of the PTFE from Example 1. All coatings passed the PWA test. Average performance in the accelerated cooking test was 101 cooks/mil to a rating of 5, substantially better than Control A. These results show excellent performance without a blend of fluoropolymers in the prime coat.

Example 11 Formulation w/Ex 4 Polymer

Example 8 was repeated except that the modified PTFE prepared in Example 4 was used instead of the PTFE from Example 1. All coatings passed the PWA test. Average performance in the accelerated cooking test was 98 cooks/mil to a rating of 5, substantially better than Control A. Again, these results show excellent performance without a blend of fluoropolymers in the prime coat.

Example; 12

For reference, this example is the prime coat described in table 1 of EXAMPLE 7=Control A.

Control B Topcoat

The topcoat coating composition shown in Table 3 was prepared for use as a control, and as a reference for subsequent examples of the invention. The acrylic polymer shown in Table 3 was an acrylic polymer composed of 39 wt % methyl methacrylate, 57 w% ethyl acrylate and 4 wt % methacrylic acid and having a maximum decomposition rate in the range of 380°–400° C. as measured by TGA.

TABLE 3

Control B Topcoat Formulation

| Amount (wt %) | Ingredient |
|---|---|
| 0.80 | Afflair ® pigment (blend) |
| 0.17 | Ultramarine blue pigment |
| 0.40 | Channel black pigment |
| 0.20 | Aluminum silicate |
| 41.30 | High molecular weight PTFE |
| 4.90 | Acrylic (MMA/EA/MAA = 39/57/4) |
| 0.56 | Cerium octoate |
| 1.17 | Oleic acid |
| 0.07 | Sodium polynapthalene sulfonate |
| 3.07 | Triton ® X-100 |
| 2.31 | Diethylene glycol monobutyl ether |
| 37.86 | Water |
| 4.39 | Triethanol amine |
| 2.88 | Aromatic hydrocarbon |

The FEP fluoropolymer is the same as used in Control A.

TABLE 4

Primer Formulations

| Amount wt % | | Ingredient |
|---|---|---|
| Ex. 12 | Ex. 13 | |
| 0.01 | 0.01 | Zinc oxide |
| 6.81 | 6.76 | Ultramarine blue pigment |
| 1.02 | 1.01 | Colloidal silica (Ludox ® AM, DuPont) |
| 11.21 | 6.68 | Modified PTFE (Ex. 5) |
| — | 4.45 | FEP fluoropolymer |
| 4.92 | 4.89 | Polyamide imide (AI-10, Amoco) |
| 66.05 | 66.34 | Water |
| 0.71 | 0.64 | Triton ® X-100 (Union Carbide) |
| 0.25 | 0.25 | Surfynol ® 440 (Air Products) |
| 3.10 | 3.17 | N-methyl-2-pyrrolidone |
| 0.69 | 0.68 | Diethylethanol amine |
| 1.37 | 1.36 | Triethyl amine |
| 3.79 | 3.76 | Furfuryl alcohol |

Example 14 Primer

The dispersion composition of Example 12 was prepared except that the modified PTFE of Example 5 was replaced in like amount by the modified PTFE of Example 2.

Example 15 Primer

The dispersion composition of Example 13 was prepared except that the modified PTFE of Example 5 was replaced in like amount by the modified PTFE of Example 2.

Example 16 Topcoat

The dispersion composition of Control B was prepared except that the high molecular weight PTFE was replaced by the modified PTFE of Example 5, and the acrylic polymer was replaced by the acrylic polymer having low decomposition temperature of Example 7, both in like amounts.

Example 17 Topcoat

The dispersion composition of Example 16 was prepared except that the modified PTFE of Example 5 was replaced in like amount by the modified PTFE of Example 2.

Examples 18–24 and Controls C-D PWA

Coatings were prepared as outlined above using primer and topcoat compositions as indicated in Table 5, and using the cure times and temperatures as also given therein. Coatings were tested for adhesion by the fingernail adhesion test before exposure to boiling water (designated in Table 5 by "Dry"), by the PWA test, and by the cross-hatch test. Entries under "x-hatch" are the number of squares of coating removed in the test. As shown by the adhesion test results, also shown in the table, coatings of this invention can be prepared at lower curing temperature and/or lower curing time.

TABLE 5

Adhesion Results for Examples 18–24 and Control

| Ex. | Primer | Topcoat | Cure T (° C.) | Cure t (min) | Dry | PWA | x-hatch |
|---|---|---|---|---|---|---|---|
| C | A | B | 426 | 3–4 | pass | pass | 0 |
| D | A | B | 400 | 10 | fail | fail | 47–60 |
| 18 | Ex 12 | Ex 16 | 400 | 10 | pass | pass | 0 |
| 19 | Ex 12 | Ex 16 | 400 | 3 | pass | pass | 0 |
| 20 | Ex 13 | Ex 16 | 400 | 3 | pass | pass | 0 |
| 21 | Ex 14 | Ex 17 | 426 | 3 | pass | pass | 0 |
| 22 | Ex 15 | Ex 17 | 426 | 3 | pass | pass | 0 |
| 23 | Ex 15 | Ex 17 | 400 | 3 | pass | pass | 0 |
| 24 | Ex 15 | Ex 17 | 380 | 10 | pass | pass | 0 |

Control E Shear Stability

A dispersion composition was prepared as summarized in the following table. The high molecular weight PTFE was the same as used in other formulations. When this composition was subject to shear in a Waring Blender at 14,500 rpm, the sample coagulated in 6 min, 56 s.

| Amount (wt %) | Ingredient |
|---|---|
| 42.31 | High molecular weight PTFE |
| 5.24 | Acrylic polymer (Ex. 7) |
| 0.59 | Cerium octdate |
| 1.24 | Oleic acid |
| 3.17 | Triton ® X-100 |
| 2.45 | Diethylene glycol monobutyl ether |

-continued

| Amount (wt %) | Ingredient |
| --- | --- |
| 37.33 | Water |
| 4.65 | Triethanol amine |
| 3.00 | Aromatic hydrocarbon |

Example 25

The dispersion composition of Control E was prepared except that the high molecular weight PTFE was replaced in like amount by the PTFE of Example 1. When this formula was subjected to shear in a Waring Blender at 14,500 rpm as in Control E, the sample coagulated in 21 min, 8 s, showing the shear stability advantage of dispersion compositions of this invention.

Example 26

The procedure of Example 6 was essentially repeated to obtain a modified PTFE dispersion having RDPS of 260 nm (PCS method). SSG was 2.171, MV was $2.6 \times 10^8$ Pa·s, PPVE content was 0.24 wt %, and rheometer pressure 9036 psi (62.3 MPa). A portion of the raw dispersion was concentrated to 60.7 wt % solids and 5.8 wt % Triton® X-100. When this dispersion was subjected shear in a commercial Waring Blender (model 35BL.33) at a setting of high speed, the sample gelled in 18–20 min. In comparison, when the high molecular weight PTFE used in controls herein is subjected to the same test, gellation occurs in 6–8 min.

Example 27

The modified PTFE dispersion of Example 26 was used to formulate the dispersion composition shown in the following table. When this composition was subjected to high shear as in Example 25, it did not coagulate in 30 min. A similar formulation using a like amount of the high molecular weight PTFE used herein for control gelled in 10–12 min. The comparison shows the stability advantage of dispersion compositions containing the modified PTFE of this invention.

| Amount(wt %) | Ingredient |
| --- | --- |
| 0.82 | Afflair ® pigment |
| 0.19 | Channel black pigment |
| 0.08 | Ultramarine blue pigment |
| 41.76 | Modified PTFE (Ex. 26) |
| 0.59 | Cerium octoate |
| 0.01 | Sodium polynapthalene sulfonate |
| 1.60 | Diethylene glycol monobutyl ether |
| 1.23 | Oleic acid |
| 2.64 | Triethanol amine |
| 39.79 | Water |
| 0.24 | Surfynol ® 440 |
| 3.47 | Triton ® X-100 |
| 5.21 | Acrylic polymer (Ex. 7) |

The following is claimed:

1. A coated article comprising a substrate coated with a coating having at least two layers, comprising a prime coat, a topcoat, and optionally one or more intermediate coats between said prime coat and said topcoat, wherein at least said prime coat comprises a single tetrafluoroethylene polymer selected from the group consisting of (a) a tetrafluoroethylene homopolymer, said polymer having standard specific gravity of at least 2.250 and melt viscosity in the range from about $3 \times 10^8$ to about $3 \times 10^9$ Pa·s, and (b) a non-melt-fabricable tetrafluoroethylene copolymer, said copolymer containing at least 0.01% by weight of comonomer and having standard specific gravity of at least 2.165 and melt creep viscosity in the range from $1 \times 10^7$ to $1 \times 10^9$ Pa·s.

2. The coated article of claim 1, wherein said prime coat further comprises adhesion promoter.

3. The coated article of claim 2, wherein said adhesion promoter is at least one member selected from the group consisting of polyamide imide, polyarylene sulfide and polyethersulfone resins.

4. A dispersion composition comprising particles of acrylic copolymer having decomposition temperature of less than 340° C. as determined by thermogravimetric analysis and particles of a tetrafluoroethylene polymer selected from (a) a tetrafluoroethylene homopolymer, said polymer having standard specific gravity of at least 2.250 and melt viscosity in the range from about $3 \times 10^8$ to about $3 \times 10^9$ Pa·s, and (b) a non-melt-fabricable tetrafluoroethylene copolymer, said copolymer containing at least 0.01% by weight of comonomer and having standard specific gravity of at least 2.165 and melt creep viscosity in the range from $1 \times 10^7$ to $1 \times 10^9$ Pa·s.

5. The dispersion composition of claim 4, wherein the amount of said tetrafluoroethylene polymer is from 75 to 95% by weight and the amount of said acrylic copolymer is from 5 to 25% by weight based on combined weights of tetrafluoroethylene polymer and acrylic copolymer.

6. The dispersion composition of claim 4, wherein said acrylic copolymer comprises from 93% to 98% by weight of butyl methacrylate and from 2% to 7% by weight of methacrylic acid.

7. A coated article comprising a substrate coated with a coating having at least two layers, comprising a prime coat, a topcoat, and optionally one or more intermediate coats between said primer and said topcoat, wherein at least one of said topcoat and intermediate coats is formed from the dispersion composition of claim 4.

8. The dispersion composition of claim 4 wherein said tetrafluoroethylene polymer is said non-melt-fabricable tetrafluoroethylene copolymer and said viscosity of said copolymer is $1 \times 10^7$ to $3 \times 10^8$ Pa·s.

9. The dispersion composition of claim 4 wherein said non-melt-fabricable tetrafluoroethylene copolymer has a standard specific gravity of at least 2.180.

10. A dispersion composition comprising particles of adhesion promoter and particles of a single tetrafluoroethylene polymer selected from (a) a tetrafluoroethylene homopolymer, said polymer having standard specific gravity of at least 2.250 and melt viscosity in the range from about $3 \times 10^8$ to about $3 \times 10^9$ Pa·s, and (b) a non-melt-fabricable tetrafluoroethylene copolymer, said copolymer containing at least 0.01 % by weight of comonomer and having standard specific gravity of at least 2.165 and melt creep viscosity in the range from $1 \times 10^7$ to $1 \times 10^9$ Pa·s.

11. The dispersion composition of claim 10, wherein said adhesion promoter is at least one member selected from the group consisting of polyamide imide, polyarylene sulfide and polyethersulfone resins.

12. The dispersion composition of claim 10 wherein said tetrafluoroethylene polymer is said non-melt-fabricable tetrafluoroethylene copolymer and said viscosity of said copolymer is $1 \times 10^7$ to $3 \times 10^8$ Pa·s.

13. The dispersion composition of claim 10 wherein said tetrafluoroethylene polymer is said non-melt-fabricable tetrafluoroethylene copolymer having a standard specific gravity of at least 2.180.

14. A tetrafluoroethylene homopolymer, said polymer having standard specific gravity of at least 2.250 and melt creep viscosity in the range from about $3 \times 10^8$ to about $3 \times 10^9$ Pa·s.

15. The tetrafluoroethylene homopolymer of claim 14, wherein said melt viscosity is from $8\times10^8$ to $3\times10^9$ Pa·s.

16. A coated article comprising a substrate coated with a coating having at least two layers, comprising a prime coat, a topcoat, and optionally one or more intermediate coats between said prime coat and said topcoat, wherein at least said prime coat comprises a tetrafluoroethylene polymer selected from the group consisting of (a) a tetrafluoroethylene homopolymer, said polymer having standard specific gravity of at least 2.250 and melt viscosity in the range from about $3\times10^8$ to about $3\times10^9$ Pa·s, and (b) a non-melt-fabricable tetrafluoroethylene copolymer, said copolymer containing at least 0.01% by weight of comonomer and having standard specific gravity of at least 2.165 and melt creep viscosity in the range from $1\times10^7$ to $3\times10^8$ Pa·s.

17. The coated article of claim 16 wherein said non-melt-fabricable tetrafluoroethylene copolymer has a standard specific gravity of at least 2.180.

18. A coated article comprising a substrate coated with a coating having at least two layers, comprising a prime coat, a topcoat, and optionally one or more intermediate coats between said prime coat and said topcoat, wherein at least said prime coat comprises a tetrafluoroethylene polymer selected from the group consisting of (a) a tetrafluoroethylene homopolymer, said polymer having standard specific gravity of at least 2.250 and melt viscosity in the range from about $3\times10^8$ to about $3\times10^9$ Pa·s, and (b) a non-melt-fabricable tetrafluoroethylene copolymer, said copolymer containing at least 0.01% by weight of comonomer and having standard specific gravity of at least 2.180 and melt creep viscosity in the range from $1\times10^7$ to $1\times10^9$ Pa·s.

* * * * *